(12) United States Patent
Joseph et al.

(10) Patent No.: US 6,965,992 B1
(45) Date of Patent: Nov. 15, 2005

(54) METHOD AND SYSTEM FOR NETWORK SECURITY CAPABLE OF DOING STRONGER ENCRYPTION WITH AUTHORIZED DEVICES

(75) Inventors: Boby Joseph, Mt. Prospect, IL (US); Michael Freed, Arlington Heights, IL (US); Michael S. Borella, Naperville, IL (US)

(73) Assignee: 3Com Corporation, Marlborough, MA (US)

( * ) Notice: Subject to any disclaimer, the term of this patent is extended or adjusted under 35 U.S.C. 154(b) by 0 days.

(21) Appl. No.: 09/511,751

(22) Filed: Feb. 24, 2000

(51) Int. Cl.$^7$ ................................................ H04L 9/00
(52) U.S. Cl. .................. 713/153; 380/281; 380/284
(58) Field of Search ................ 713/153; 380/281, 380/284

(56) References Cited

U.S. PATENT DOCUMENTS

| | | | |
|---|---|---|---|
| 4,200,770 A | | 4/1980 | Hellman et al. ............... 178/22 |
| 4,731,840 A | * | 3/1988 | Mniszewski et al. ........ 380/284 |
| 5,124,117 A | * | 6/1992 | Tatebayashi et al. ........ 380/281 |
| 5,636,280 A | | 6/1997 | Kelly ........................... 380/21 |
| 5,850,443 A | | 12/1998 | Van Oorschot et al. ........ 380/21 |
| 5,930,362 A | | 7/1999 | Daly et al. ..................... 380/21 |
| 5,970,149 A | | 10/1999 | Johnson ......................... 380/49 |
| 5,995,624 A | | 11/1999 | Fielder et al. ................. 380/25 |
| 5,999,622 A | | 12/1999 | Yasukawa et al. ............. 380/4 |
| 5,999,629 A | * | 12/1999 | Heer et al. ..................... 705/51 |
| 6,006,328 A | | 12/1999 | Drake ........................ 713/200 |
| 6,009,177 A | | 12/1999 | Sudia .......................... 380/25 |
| 6,105,134 A | * | 8/2000 | Pinder et al. ............... 713/170 |

OTHER PUBLICATIONS

Information Sciences Institute, Internet Engineering Task Force ("IETF"), Request for Comments ("RFC") RFC-791 "Internet Protocol," Sep. 1981, pp. 1-49.
IETF, RFC-2401, "Security Architecture for the Internet Protocol," Nov. 1998, pp. 1-66.
IETF, RFC-2407, "The Internet IP Security Domain of Interpretation for ISAKMP," Nov. 1998, pp. 1-32.
IETF, RFC-2408, "Internet Security Association and Key Management Protocol (ISAKMP)," Nov. 1998, pp. 1-86.
IETF, RFC-2409, "The Internet Key Exchange (IKE)," Nov. 1998, pp. 1-130.
IETF, RFC-2510, "Internet X.509 Public Key Infrastructure Certificate Management Protocols," Mar. 1999, pp. 1-72.
IETF, RCF-2511, "Internet X.509 Certificate Request Message Format," Mar. 1999, pp. 1-25.

(Continued)

*Primary Examiner*—Gilberto Barron
*Assistant Examiner*—Benjamin E. Lanier
(74) *Attorney, Agent, or Firm*—McDonnell Boehnen Hulbert & Berghoff LLP

(57) ABSTRACT

A method and system for network security includes a first network device having a first set of key material with a base key and a key extension, and a second network device also having the first set of key material and a second set of key material with a second base key. The second network device is capable of communicating with the first network device using security determined by the first set of key material. The method and system for network security may further include a third network device having the second set of key material. The third network device is capable of communicating with the second network device using security determined by the second set of key material. For the present method and system, security determined by the first set of key material is stronger than security determined by the second set of key material.

32 Claims, 9 Drawing Sheets

OTHER PUBLICATIONS

International Telecommunication Union (ITU-T), Recommendation X.509, "Series X: Data Networks and Open System Communications," Mar. 2000.

Diffie et al., "New Directions in Cryptography", *IEEE Transactions on Information Theory*, vol. IT-22, No. 6, Nov. 1976, pp. 644-654.

* cited by examiner

METHOD AND SYSTEM FOR NETWORK SECURITY CAPABLE OF DOING STRONGER ENCRYPTION WITH AUTHORIZED DEVICES

FIELD OF INVENTION

This invention relates to security for computer networks. More specifically, it relates to a method and system for implementing network security that is capable of doing stronger encryption with authorized network devices, and weaker encryption with unauthorized network devices.

BACKGROUND OF THE INVENTION

Internet Security Overview

The Internet was not originally designed to be secure. The development of the ARPANET as the first "network of networks" was driven by the need for open communication between scientists and researchers. It is often desirable, however, especially with the advent of commerce on the Internet, to protect information sent over the Internet against interception, examination, and/or alteration, as well as to authenticate the source or destination of the information.

As known in the art, Internet Protocol is a common addressing protocol designed to facilitate the routing of traffic within a network or between networks. For more information on IP, see RFC 791, specifically incorporated herein by reference. Currently, a number of security options exist for Internet users implementing IP, including the Internet Protocol Security ("IPSEC"). IPSEC is a set of protocols for implementing security for communications on networks through the use of cryptographic key management procedures and protocols. For more information on IPSEC, see Internet Engineering Task Force ("IETF"), Requests For Comments ("RFC") 2401, specifically incorporated herein by reference.

The applications of IPSEC are numerous, including virtual private networks ("VPNs"), secure remote access, email privacy, and electronic commerce. However, in order for two network devices to communicate securely, they must be able to exchange keying material, typically over an insecure channel. Indeed, secure key exchange is an integral prerequisite of the IPSEC set of Internet security standards, and a comprehensive suite of protocols for allowing secure key exchange have been developed. The IPSEC standard for secure key exchange is the Internet Key Exchange ("IKE") protocol. IKE allows two hosts to derive session keys via a series of messages that provide authentication and protection against flooding, replay, and spoofing attacks. IKE relies on the same cryptographic innovations that power most network security systems: public-key cryptography, such as Diffie-Hellman exchanges and RSA public-key/private-key pairs, symmetric-key cryptographic ciphers (e.g., data encryption algorithm ("DES"), triple DES ("3DES"), and international data encryption algorithm ("IDEA")), and hashing algorithms for authentication (e.g., MD5 and secure hash algorithm ("SHA")). For more information on IKE, see RFC 2409, specifically incorporated herein by reference.

IKE also allows the use of a public-key infrastructure, which is an architecture that allows entities to place their public key(s) into certificates. These certificates are data structures that bind the public key(s) to the entity. The binding is achieved by having a trusted third party (i.e., a certification authority ("CA")) digitally "sign" an entity's certificate. Typically, the CA will first verify that the public-key belongs to the entity through some out-of-band means, such as a phone call or a physical meeting. Thus, any second entity that trusts the CA will be reasonably assured of the certificate's veracity. By the establishment of a hierarchy of CAs, anyone with Internet access will be able to verify the public key of an entity that offers a certificate. Entities may store their certificates in public databases to ease retrieval. IKE typically uses such a public-key infrastructure in order for participants to authenticate themselves to one another when using public-key cryptography. The public-key infrastructure currently being standardized for the Internet is based on the framework set forth in the International Telecommunications Union Recommendation X.509, specifically incorporated herein by reference. For more information on Internet X.509 security certificates, see RFC-2459, specifically incorporated herein by reference. For more information on X.509 security certificate management, see RFC-2510 and RFC-2511, both of which are specifically incorporated herein by reference.

Other members of the IPSEC suite of protocols include the Internet Security Association and Key Management Protocol ("ISAKMP"), the ISAKMP Domain of Interpretation ("DOI"), and OAKLEY. ISAKMP provides detailed protocol descriptions and packet formats for IKE. The packet formats are created through the use of over a dozen different payload formats, which may appear in various combinations. Each payload holds a particular type of data used in key exchange, and contains a pointer to the next payload in the packet. By stringing together a series of these payloads, ISAKMP packets can contain all of the data necessary for a particular IKE message. ISAKMP also defines the processing requirements for each header. For more information on ISAKMP, see RFC 2408, specifically incorporated herein by reference.

Some packet formats and field values are not defined in ISAKMP, but instead are defined in the ISAKMP DOI. The ISAKMP DOI (also referred to as the IPSEC DOI, or just the DOI) defines an IPSEC-specific interpretation of certain parts of ISAKMP headers and payloads. For example, the DOI defines how to interpret ISAKMP fields that refer to specific encryption and authentication algorithms, and defines packet formats for holding IP addresses. For more information on ISAKMP DOI, see RFC 2407, specifically incorporated herein by reference.

OAKLEY describes a family of canonical key exchange sequences and the security properties of each. Only a subset of the OAKLEY exchanges are used with IKE. The strengths of various encryption groups are presented as well. OAKLEY also discusses deriving new keys from existing keys and some protocol issues, such as how to handle message timeouts and how to format certain values. Overall, OAKLEY focuses on the mathematical side of key exchange, and serves as a guide for implementing protocols. For more information on OAKLEY, see RFC 2412, specifically incorporated herein by reference.

Varying Strength For Internet Security Needed

As explained above, Internet security is largely based on cryptographic keys. Such keys may vary in bit length, with a larger bit length indicating a stronger encryption and Internet security, and a smaller bit length indicating a weaker encryption and Internet security. Under certain circumstances, it may be necessary or desirable to use Internet security with varying encryption strengths. The prior art, however, does not disclose a security system or method that is capable of restricting a network device from using stronger encryption regardless of local policy.

As an example of the need for varying security strength, the United States ("U.S.") government now freely allows export of IPSEC network client devices outside of the U.S. ("foreign devices") that are capable of doing data encryption with keys greater than 64 bits, but only if the connection (i.e., data traffic) is between the foreign devices and a peer network device (e.g., a server) residing in the U.S. Unless government approval is sought and given, however, each foreign device should not have the capability to do any encryption with keys greater than 64 bits if its peer is not in the U.S. By doing this, government agencies can monitor the data encrypted with greater than 64 bit keys, if so desired, by contacting the authorities who own the IPSEC network device in the U.S. (e.g., the U.S. server).

As another example of the need for varying security strength, some foreign governments regulate the bit length of encryption keys used by imported network devices. For instance, France requires government approval for importing network devices into the country that are capable of doing data encryption with keys greater than 40 bits in length. Consequently, network devices being imported into France (or any similar foreign country) must be custom designed to account for this encryption limitation to avoid government interference. Such customization is often complex and costly for network device manufacturers.

As a result of these regulations, U.S. based organizations, such as financial institutions, that have overseas satellite offices are purchasing IPSEC network client devices from overseas vendors, so that they can perform encryption with more that 64 bit keys in their sites not within the U.S. In other words, overseas vendors are not limited by their respective countries to encryption with no greater than 64 bit keys. Consequently, U.S. vendors of IPSEC solutions are losing a large overseas market share. In addition, network device manufacturers are being forced to specially customize their network devices for importing into certain foreign countries that require government approval for stronger encryption.

Accordingly, it would be desirable to provide an Internet security system and method that enables a network device to selectively use both stronger encryption (i.e., greater than 64 key bits) and weaker encryption (i.e., no greater than 64 bit keys) automatically, depending on one or more factors, such as location. More specifically, it would be desirable to provide an Internet security system and method that enables a foreign network device to implement stronger encryption via greater than 64 bit keys (or some other threshold key length) with other network devices residing in the U.S., yet automatically prevents the foreign network device from implementing such stronger encryption with other network devices not residing in the U.S. It would also be desirable to provide such selective strength encryption without resorting to complex and costly customizing procedures.

SUMMARY OF THE INVENTION

The present invention provides a system for network security comprising a first network device having a first set of key material with a base key and a key extension, and a second network device having the first set of key material and a second set of key material with a second base key. The second network device is capable of communicating with the first network device using security determined by the first set of key material. The system further comprises a third network device having the second set of key material, with the third network device being capable of communicating with the second network device using security determined by the second set of key material. In this system of the present invention, security determined by the first set of key material is stronger than security determined by the second set of key material.

The present invention also provides a system for network security comprising a first network device having a first set of key material with a first base key and a first key extension, and a second set of key material with a second base key and a second key extension. In addition, the system comprises a second network device having the first set of key material and a third set of key material, with the second network device being capable of communicating with the first network device using security determined by the first encryption key. The system further comprises a third network device having the second set of key material and the third set of key material, with the third network device being capable of communicating with the first network device using security determined by the second set of key material, and also being capable of communicating with the second network device using security determined by the third set of key material. In this system of the present invention, security determined by the first set of key material is stronger than security determined by the third set of key material, and security determined by the second set of key material is stronger than security determined by the third set of key material.

Moreover, the present invention provides a method for network security comprising the step of providing a first network device, a second network device, and a third network device. The method also comprises the steps of establishing a first secure communication between the first and second network devices based on a first encryption key having a base key and a key extension, and establishing a second secure communication between the second and third network devices based on a second encryption key. In addition, the method comprises the step of using a stronger security for the first secure communication than the second secure communication.

Furthermore, the present invention provides a method for network security comprising the step of providing a first network device, a second network device, and a third network device. The method also comprises the steps of negotiating a first secure communication between the first and second network devices based on a first authentication key with a base key and a key extension, and negotiating a second secure communication between the second and third network devices based on a second authentication key. The method further comprises the step of using a stronger security for the first secure communication than the second secure communication.

DETAILED DESCRIPTION OF PREFERRED EMBODIMENTS

Exemplary Network Security System

Figure 1:
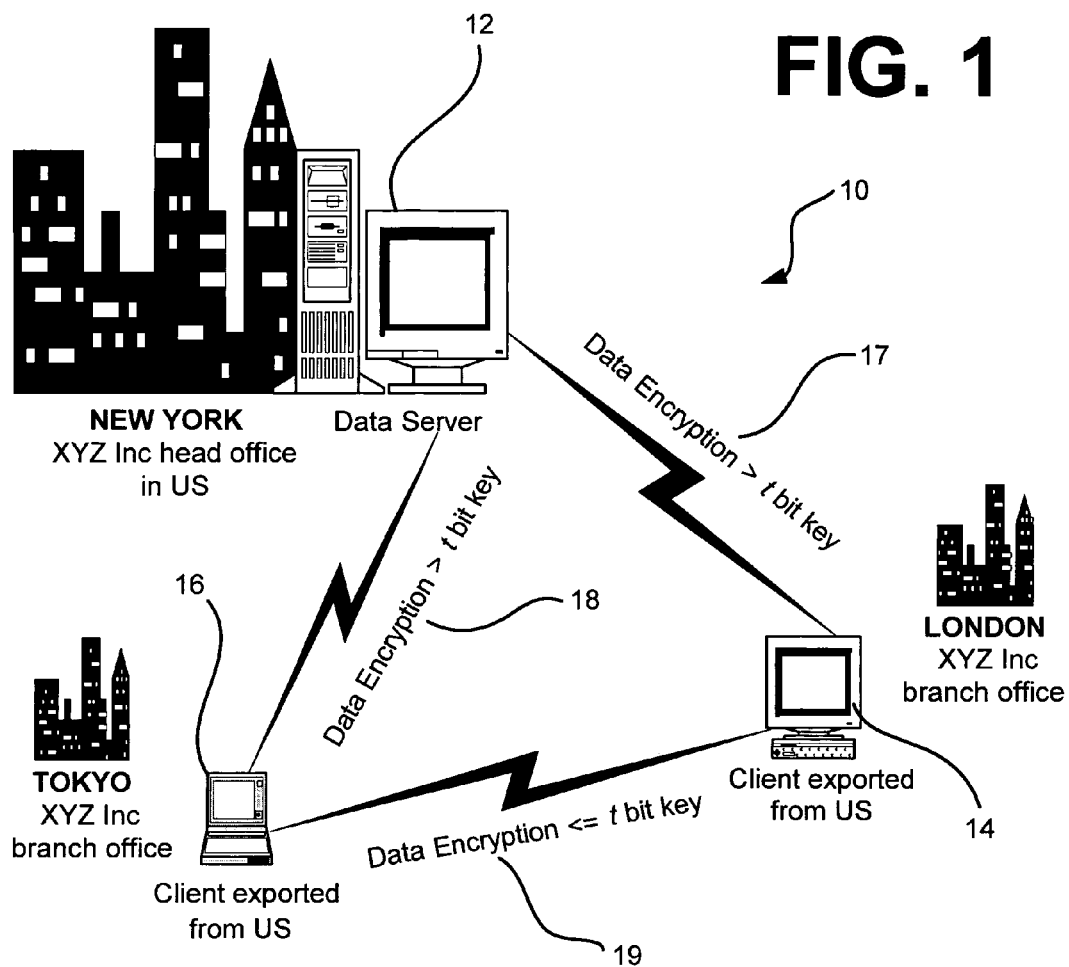
FIG. 1 is a block diagram illustrating a preferred network security system of the present invention.

FIG. 1 is a block diagram illustrating an exemplary network security system 10 for one preferred embodiment of the present invention. The network security system 10 includes a first network device 12 (e.g., a data server) that is located in a first jurisdiction, preferably the U.S. As shown in FIG. 1, the first network device 12 may be located in a New York head office of a fictional company called "XYZ Inc." The network security system 10 also includes a second network device 14 (e.g., a client terminal) that is connected to and in communication with the first network device 12, and is located in a second jurisdiction, preferably outside of the U.S. As shown in FIG. 1, the second network device 14 may be exported from the U.S. and located in a London branch office of XYZ Inc.

Moreover, the network security system 10 further includes a third network device 16 (e.g., another client terminal) that is connected to and in communication with both the first and second network devices 12, 14, and is located in a third jurisdiction, preferably outside of the U.S. Like the second network device 14, the third network device may also be exported from the U.S. and located in a Tokyo branch office of XYZ Inc. It should be understood, however, that the third network device 16 may be connected to and in communication with the second network device 14, but not the first network device 12, and the third network device may alternatively be located in the second jurisdiction.

Similarly, it should also be understood that network types, devices, configurations, and components other than those described herein can also be used with the network security system 10, and the present invention is not limited to the network types, devices, configurations, and components described for this preferred embodiment. The present invention can be used with virtually any network using the IP or other protocols in the IP suite.

Network devices for preferred embodiments of the present invention include network devices that can interact with the network security system 10 based on standards proposed by the Institute of Electrical and Electronic Engineers ("IEEE"), International Telecommunications Union-Telecommunication Standardization Sector ("ITU"), Internet Engineering Task Force ("IETF"), or Wireless Application Protocol ("WAP") Forum. However, network devices based on other standards could also be used. IEEE standards can be found on the World Wide Web at the Universal Resource Locator ("URL") "www.ieee.org." The ITU, (formerly known as the CCITT) standards can be found at the URL "www.itu.ch." IETF standards can be found at the URL "www.ietf.org." The WAP standards can be found at the URL "www.wapforum.org."

An operating environment for network devices of the present invention includes a processing system with at least one high speed Central Processing Unit ("CPU") and a memory. In accordance with the practices of persons skilled in the art of computer programming, the present invention is described below with reference to acts and symbolic representations of operations or instructions that are performed by the processing system, unless indicated otherwise. Such acts and operations or instructions may be referred to as "computer-executed" or "CPU executed."

It will be appreciated that acts and symbolically represented operations or instructions include the manipulation of electrical signals or biological signals by the CPU. An electrical system or biological system represents data bits which cause a resulting transformation or reduction of the electrical signals or biological signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

As shown in FIG. 1, the network devices 12, 14, 16 communicate with each other via IP data packets that are encrypted using some form of varying strength data encryption. Preferably, the data encryption is determined by and/or based on one or more sets of keying material 17, 18, 19 having encryption keys 20, 22, 24 with different lengths. The first and second network devices 12, 14 use a first set of keying material 17 for determining data encryption and secure communication between the two network devices. The first set of keying material 17 comprises a first encryption key 20 (FIG. 2A), and if IKE negotiation or some other protocol is used for authentication, a first authentication key 21 (FIG. 3A). The first encryption key 20 is greater than a threshold number of bits, t, in length and is used for stronger encryption. Preferably, the threshold number of bits for stronger encryption is 64. Alternatively, the threshold number of bits for stronger encryption may be 40.

Similarly, the first and third network devices 12, 16 use a second set of keying material 18 for determining data encryption and secure communication between the two network devices. Like the first set of keying material 17, the second set of keying material 18 comprises a second encryption key 22 (FIG. 2B), and if IKE negotiation or some other protocol is used for authentication, a second authentication key 23 (FIG. 3B). The second encryption key 22 is greater than the threshold number of bits, t, in length and is used for stronger encryption.

In addition, the second and third network devices 14, 16 use a third set of keying material 19 for determining data encryption and secure communication between the two network devices. Like the first and second sets of keying material 17, 18, the third set of keying material 19 comprises a third encryption key 24 (FIG. 2C), and if IKE negotiation or some other protocol is used for authentication, a third authentication key 25 (FIG. 3C). In contrast to the first and second encryption keys 20, 22, however, the third encryption key 24 is no more than the threshold number of bits, t, in length.

Figure 2A:
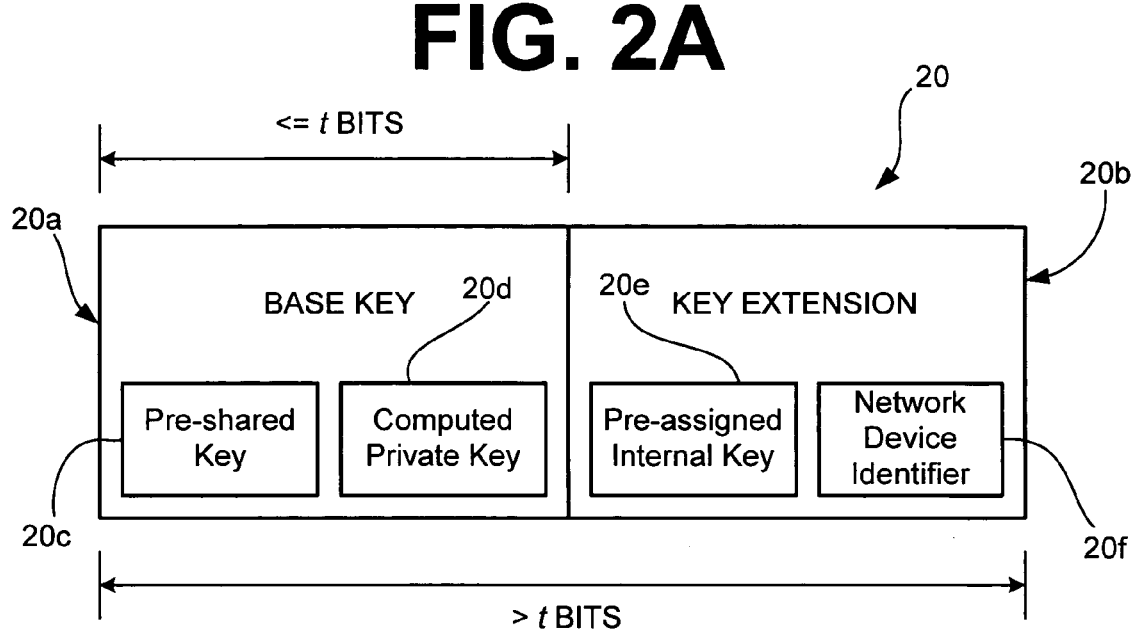
FIG. 2A is a block diagram illustrating a first encryption key for the network security system of FIG. 1.
Figure 3A:
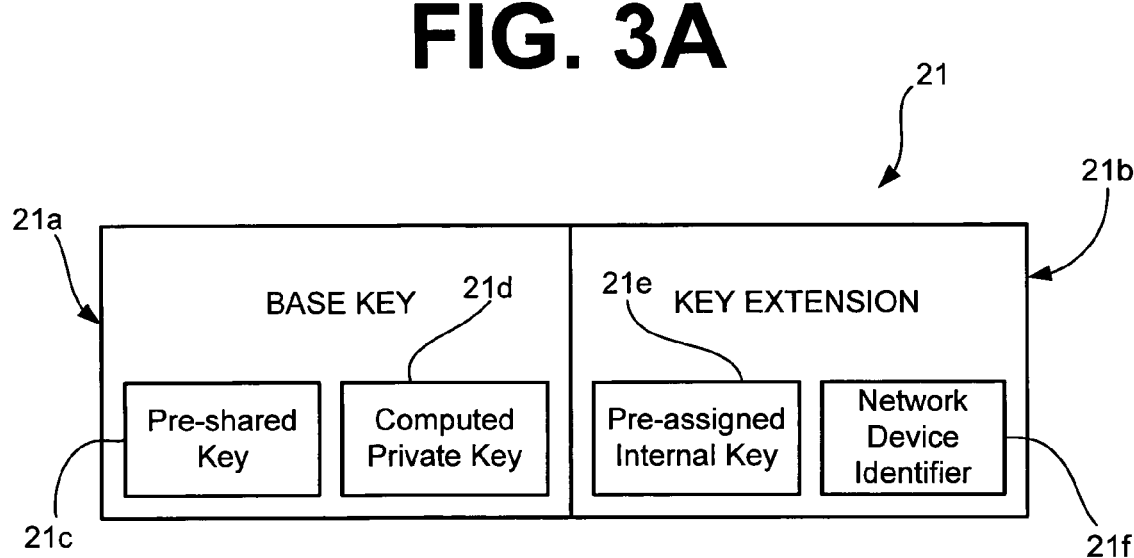
FIG. 3A is a block diagram illustrating a first authentication key for the network security system of FIG. 1.

As shown in FIG. 2A, the first encryption key 20 comprises a first base key 20a and a first key extension 20b. The first base key 20a preferably has a length no greater than the threshold number of bits, t (e.g., 64 bits), and is based on a pseudo-random function of at least a first pre-shared key 20c and a first computed private key 20d. It should be understood that the first base key 20a may be based on additional information, such as specified IPSEC control parameters. The first pre-shared key 20c is not sent between the first and second network devices 12, 14, but is rather previously distributed to and shared by each of them. Preferably, but not necessarily, the first computed private key 20d is a Diffie-Hellman key created through the well-known Diffie-Hellman algorithm. For more information on the Diffie-Hellman algorithm and its keys, see U.S. Pat. No. 4,200,770 to Hellman et al. and "New Directions in Cryptography," Diffie et al., IEEE Transactions on Information Theory, vol. IT-22, No. 6, November 1976, both of which are specifically incorporated herein by reference.

The first key extension 20b may have any desirable bit length, depending on network and/or user preferences, and is used for stronger encryption (i.e., encryption keys with lengths greater than the threshold number of bits, t). The first key extension 20b is preferably derived from a one-way hash function of a pre-assigned internal key 20e and a network device identifier 20f, such as a software serial number, for the second network device 14. The pre-assigned internal key 20e is preferably, but not necessarily, the same for all of the network devices 12, 14, 16, and may be built directly into each network device. While the second network device 14 is aware of its own network device identifier 20f, the first network device 12 may be given the network device identifier 20f by the second network device 14 during an IPSEC negotiation. The first network device 12 may also have a table for mapping the network device identifier 20f to the second network device 14.

Figure 4A:
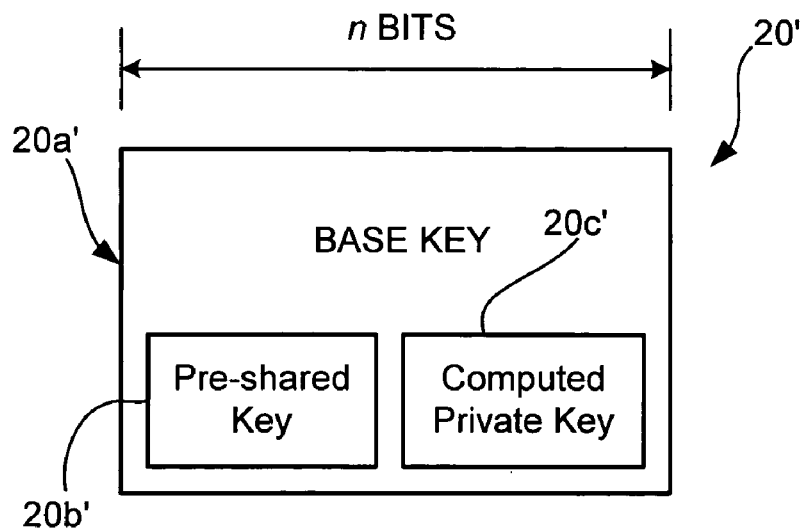
FIG. 4A is a block diagram illustrating a modified first encryption key for the network security system of FIG. 1.

When IKE negotiation or some other protocol is used for authentication, the first encryption key 20 is replaced with a modified first encryption key 20' (FIG. 4A), which is in turn used for data encryption (and decryption). The modified first encryption key 20' comprises a modified first base key 20a' that is identical to the first base key 20a, except that the length of the modified first base key 20a' is any number of bits, n, specified during IKE negotiation (or some other form of authentication) with the first authentication key 21. Preferably, however, the modified first encryption key 20' does not have or need a key extension, since its bit length and encryption strength are determined via the authentication process with the first authentication key 21.

Similar to the first encryption key 20, the first authentication key 21 comprises a first base key 21a, a first key extension 21b, a first pre-shared key 21c, and a first computed private key 21d, as shown in FIG. 3A. Preferably, but not necessarily, the first base key 21a, the first key extension 21b, the first pre-shared key 21c, and the first computed private key 21d are identical to the first base key 20a, the first key extension 20b, the first pre-shared key 20c, and the first computed private key 20d, respectively. It should be understood, however, that since the first authentication key 21 is not used directly for encryption, the first authentication key 21 may have any suitable bit length, depending upon network and/or user preferences. As discussed in more detail below, the presence of the first key extension 21b in the first authentication key 21 allows the first and second network devices 12, 14 to implement stronger encryption and negotiate a modified first encryption key 20' with a length greater than the threshold number of bits, t.

Figure 2B:
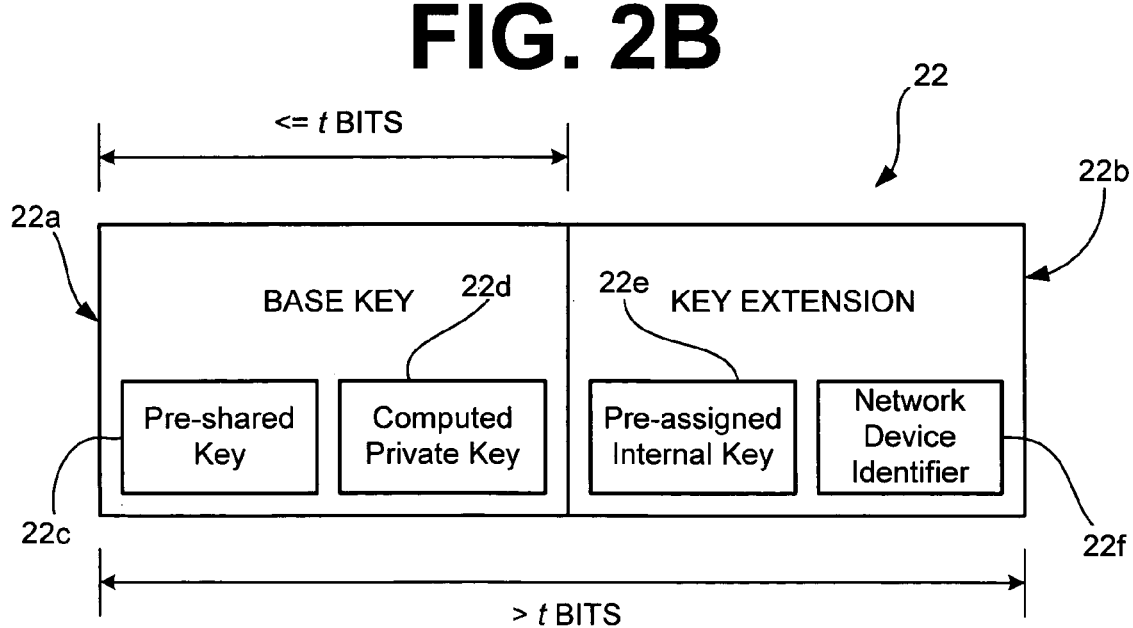
FIG. 2B is a block diagram illustrating a second encryption key for the network security system of FIG. 1.
Figure 3B:
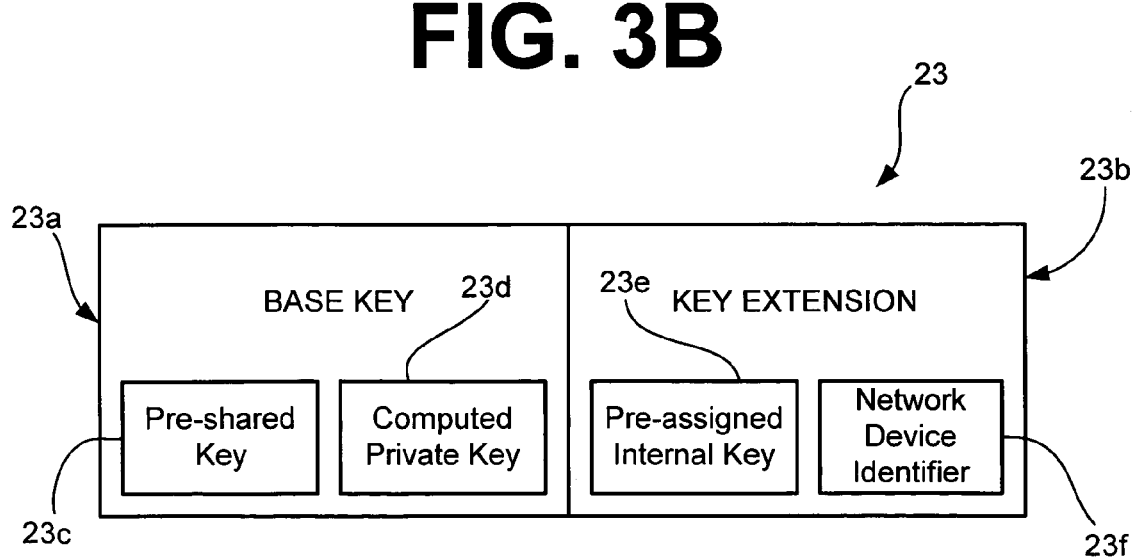
FIG. 3B is a block diagram illustrating a second authentication key for the network security system of FIG. 1.

As shown in FIG. 2B, the second encryption key 22 is nearly identical to the first encryption key 20. The second encryption key 22 comprises a second base key 22a and a second key extension 22b. The second base key 22a preferably has a length no greater than the threshold number of bits, t (e.g., 64 bits), and is based on a pseudo-random function of a second pre-shared key 22c and a second computed private key 22d. It should be understood that the second base key 22a may be based on additional information, such as specified IPSEC control parameters, and/or may be identical to the first base key 20a. The second pre-shared key is not sent between the first and third network devices 12, 16, but is rather previously distributed to and shared by each of them. Preferably, but not necessarily, the second computed private key 22d is a Diffie-Hellman key.

Like the first key extension, the second key extension 22b may have any desirable bit length, depending on network and user preferences, and is used for stronger encryption (i.e., encryption keys with lengths greater than the threshold number of bits, t). The second key extension 22b is preferably derived from a one-way hash function of a pre-assigned internal key 22e and a network device identifier 22f, such as a software serial number, for the third network device 16. As previously stated, the pre-assigned internal key 22e is preferably the same as the pre-assigned internal key 20e, which is the same for all of the network devices 12, 14, 16. While the third network device 16 is aware of its own network device identifier 22f, the first network device 12 may be given the network device identifier 22f by the third network device 16 during IPSEC negotiation. The first network device 12 may also have a table for mapping the network device identifier 22f to the third network device 16.

It should be understood that the network device identifier 22f for the third network device 16 is different from the network device identifier 20f for the second network device 14, since the second and third network devices 14, 16 are different devices (with different software serial numbers). As a result, it should also be understood that the first and second key extensions 20b, 22b are different from one another as well.

It may be desirable to build the first and second key extensions 20b, 22b directly into their respective network devices, especially those network devices that are targeted for exporting outside of the U.S. (or importing into foreign countries), such as the second and third network devices 14, 16. In the case of built-in key extensions, preferably users will be unaware of such key extensions, and will not be able to access the key extensions. In addition, unlike the first and second base keys 20a, 22a, preferably users will not be able to configure such key extensions.

Figure 4B:
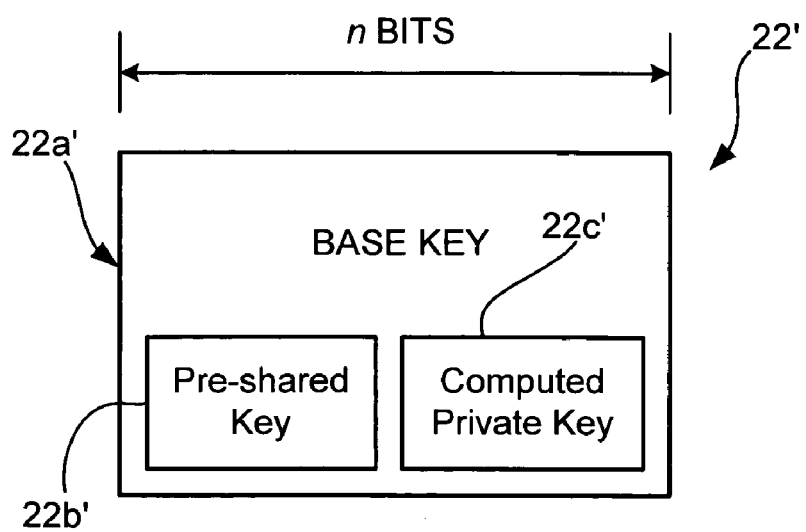
FIG. 4B is a block diagram illustrating a modified second encryption key for the network security system of FIG. 1.

When IKE negotiation or some other protocol is used for authentication, the second encryption key 22 is replaced with a modified second encryption key 22' (FIG. 4B), which is in turn used for data encryption (and decryption). The modified second encryption key 22' comprises a modified second base key 22a' that is identical to the second base key 22a, except that the length of the modified second base key 22a' is any number of bits, n, specified during IKE negotiation (or some other authentication protocol) with the second authentication key 23. Preferably, however, the modified second encryption key 22' does not have or need a key extension, since its bit length and encryption strength are determined via the authentication process with the second authentication key 23.

Similar to the second encryption key 22, the second authentication key 23 comprises a second base key 23a, a second key extension 23b, a second pre-shared key 23c, and a second computed private key 23d, as shown in FIG. 3B. Preferably, but not necessarily, the second base key 23a, the second key extension 23b, the second pre-shared key 23c, and the second computed private key 23d are identical to the second base key 22a, the second key extension 22b, the second pre-shared key 22c, and the second computed private key 22d, respectively. It should be understood, however, that since the second authentication key 23 is not used directly for encryption, the second authentication key 23 may have any suitable bit length, depending upon network and/or user preferences. As discussed in more detail below, the presence of the second key extension 23b in the second authentication key 23 allows the first and third network devices 12, 16 to implement stronger encryption and negotiate a modified second encryption key 22' with a length greater than the threshold number of bits, t.

Figure 2C:
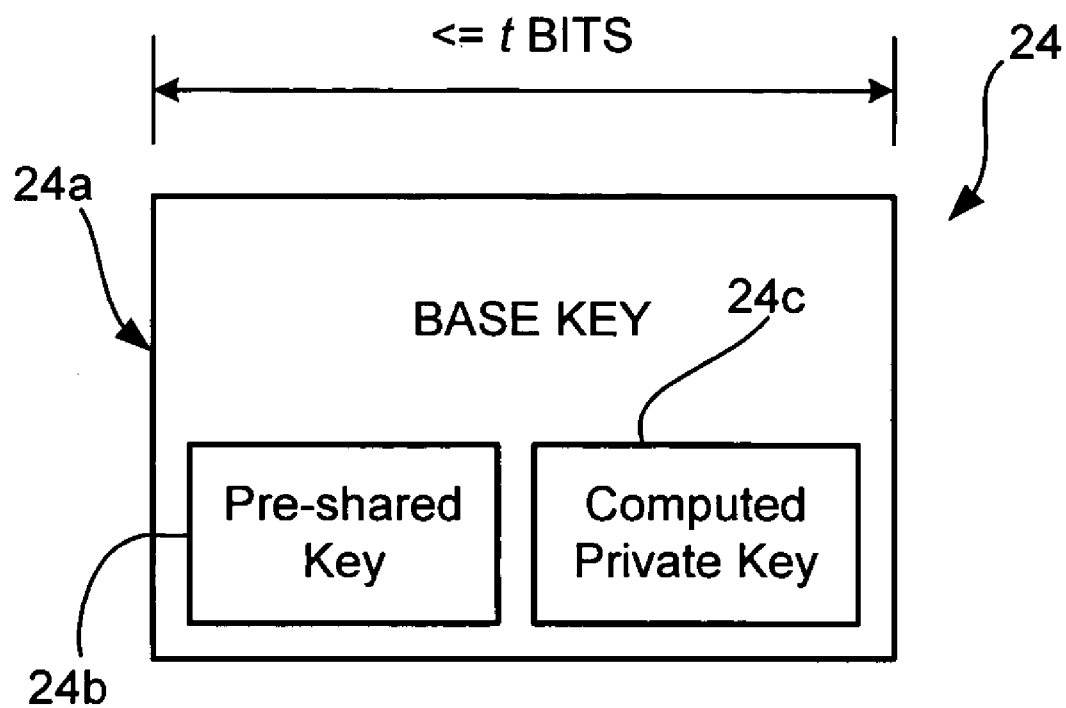
FIG. 2C is a block diagram illustrating a third encryption key for the network security system of FIG. 1.
Figure 3C:
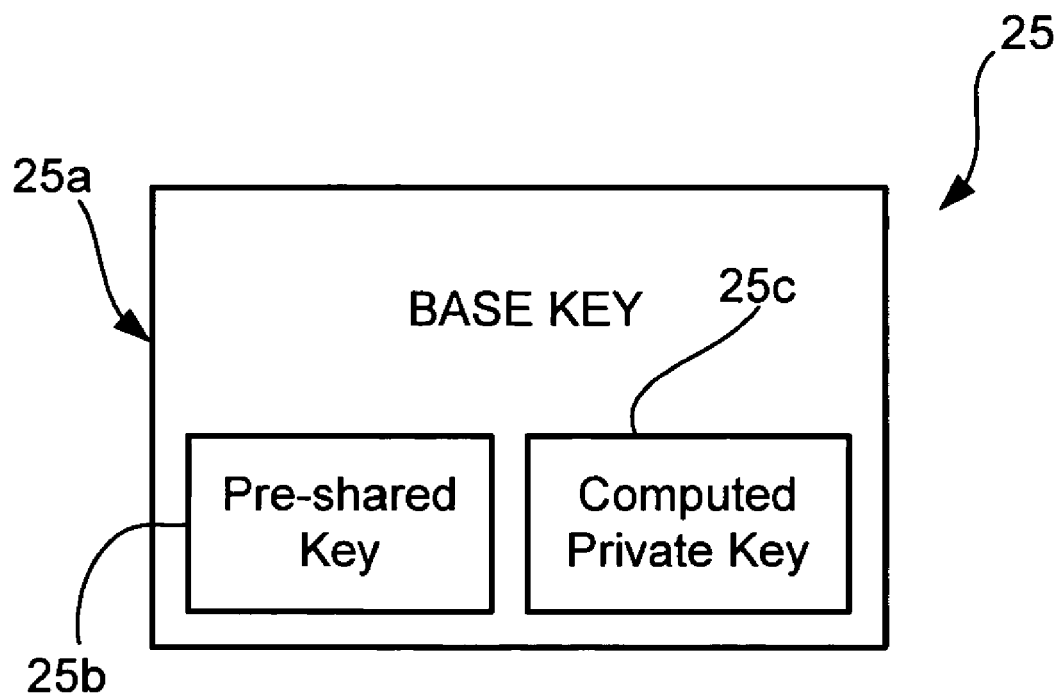
FIG. 3C is a block diagram illustrating a third authentication key for the network security system of FIG. 1.

As shown in FIG. 2C, the third encryption key 24 is similar to the first and second encryption keys 20, 22, except that while the third encryption key 24 comprises a third base key 24a, the third encryption key 24 does not have a key extension. The third base key 24a has a length no greater than the threshold number of bits, t (e.g., 64 bits), and is based on a pseudo-random function of a third pre-shared key 24b and a third computed private key 24c. It should be understood that the third base key 24a may be based on additional information, such as specified IPSEC control parameters. Like the first and second pre-shared keys, the third pre-shared key 24b is not sent between the second and third network devices 14, 16, but is rather previously distributed to and shared by each of them. Preferably, but not necessarily, the third computed private key 24c is a Diffie-Hellman key. In one exemplary embodiment of the present invention, the third base key 24a, and thus the third encryption key 24, is identical to either the first base key 20a, the second base key 22a, or both.

Figure 4C:
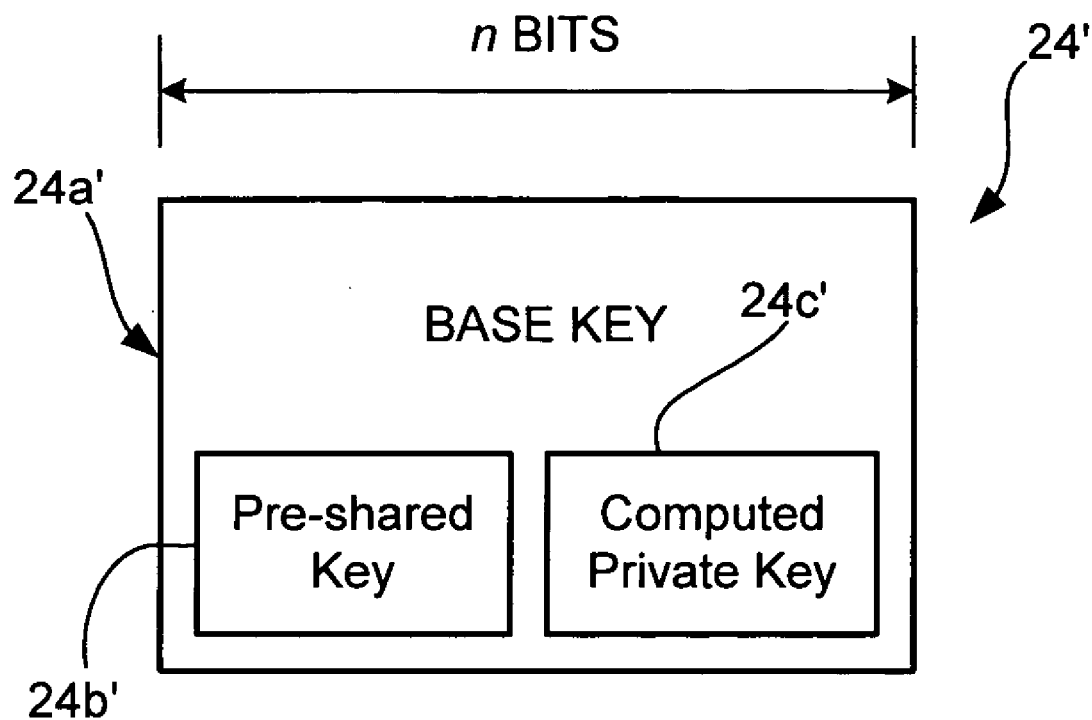
FIG. 4C is a block diagram illustrating a modified third encryption key for the network security system of FIG. 1.

When IKE negotiation or some other protocol is used for authentication, the third encryption key 24 is replaced with a modified third encryption key 24' (FIG. 4C), which is in turn used for data encryption (and decryption). The modified third encryption key 24' comprises a modified third base key 24a' that is identical to the third base key 24a, except that the length of the modified third base key 24a' is any number of bits, n, specified during IKE negotiation (or some other authentication protocol) with the third authentication key 25. As with the third encryption key 24, the modified third encryption key 24' preferably does not have a key extension.

Similar to the third encryption key 24, the third authentication key 25 comprises a third base key 25a with a third pre-shared key 25b and a third computed private key 25c, as shown in FIG. 3C. Preferably, but not necessarily, the third base key 25a, the third pre-shared key 25b, and the third computed private key 25c are identical to the third base key 24a, the third pre-shared key 24b, and the third computed private key 24c, respectively. It should be understood, however, that since the third authentication key 25 is not used directly for encryption, the third authentication key 25 may have any suitable bit length, depending upon network and/or user preferences. As discussed in more detail below, the lack of a key extension in the third authentication key 25 prevents the second and third network devices 14, 16 from implementing stronger encryption. Instead, the missing key extension causes the second and third network devices 14, 16 to negotiate a modified third encryption key 24' with a length no greater than the threshold number of bits, t.

Examples of security and data encryption techniques suitable for use with the present invention will be discussed in more detail below, followed by an explanation of the method for network security of the present invention.

Internet Protocol Security and Encryption Techniques

As stated above, the network security system of the present invention uses encryption for protecting the IP packets being transmitted by the network devices. Preferably, such protection for the IP packets is provided by IPSEC. IPSEC provides message authentication, integrity and confidentiality for the IP packets moving between a source endpoint, such as the second network device 14, and a destination endpoint, such as the first network device 12. Starting from a state in which no connection exists between the two endpoints, a Security Association ("SA") can be established based upon IP, such that each endpoint trusts the security of the connection, and an identity of each endpoint is authenticated to the other.

More specifically, IPSEC defines two security services, each having an associated header that is added to an IP packet that it protects. The two security services are an Authentication Header ("AH") and an Encapsulating Security Payload ("ESP") header. The AH provides authentication and integrity protection for IP packets. For more information on the AH, see RFC-2402, specifically incorporated herein by reference. The ESP provides encryption protection as well as optional authentication and integrity protection. For more information on the ESP, see RFC-2406, specifically incorporated herein by reference. It should be understood, however, that more or fewer security services may also be used with IPSEC and the network security system of the present invention.

As known in the art, an IPSEC protocol header specifies a protocol type (i.e., AH or ESP), and contains a numerical value called a Security Parameter Index ("SPI"). The SPI is a unique identifier associated with an SA by a receiving endpoint (e.g., the first network device 12). The identifying information is used by a receiving endpoint to help it correctly associate an IP packet with an SA.

IPSEC protocols establish and use an SA to identify a secure virtual connection between two endpoints. An SA is a unidirectional connection between two endpoints that represents a single IPSEC protocol-mode combination. Two termination endpoints (e.g., the first and second network devices 12, 14) of a single SA define a secure virtual connection that is protected by IPSEC services. One of the endpoints (e.g., the second network device 14) sends IP packets, and the other endpoint (e.g., the first network device 12) receives them. Since an SA is unidirectional, two SAs may be used for secure, bi-directional communications and a secure channel. It is also possible to configure multiple layers of IPSEC protocols between two endpoints by combining multiple SAs.

A set of protocols has been developed to allow two endpoints to establish one or more SAs between them. The process of establishing an IPSEC SA involves both negotiation and authentication. The negotiation results in an agreement between the two endpoints as to which security protocol to use, as well as specific encryption techniques, associated parameter values, and SPI assignment for each SA that was established. The authentication ensures that each endpoint can trust the identity of the other endpoint during negotiation, and hence after the SA is established.

Using ISAMKP and IKE, SA negotiation is carried out as a sequence of signaling exchanges between two endpoints. A first endpoint proposes a security protocol and encryption algorithm, and a second endpoint accepts or counter-proposes. Once the signaling is complete both endpoints have agreed to negotiated details, relevant security parameter information is exchanged and the endpoints are ready to send or receive on a single unidirectional SA.

Part of the signaling also includes exchange of authentication information. Authentication may be based on a pre-shared key that has been previously given to a pair of endpoints and is therefore trustworthy, or alternatively may be based on a trusted third-party called a Certificate Authority ("CA"). In the latter process, each endpoint generates a public/private encryption key pair, and has its public key "notarized" by the CA. The CA binds an endpoint's IP address to its public key, generates a certificate and returns it to an owner of the key for authentication purposes. Thus, IP addresses are one "security name space" used for binding public keys to their owners.

IKE is a security protocol that negotiates a session key with an SPI. However, other protocols may also be used to negotiate a session key, and the present invention is not limited to the ports, protocols, messages, security values, network addresses or network devices discussed, and other ports, protocols, messages, security values, network addresses or network devices could also be used.

Selective Strength Encryption

Figure 5:
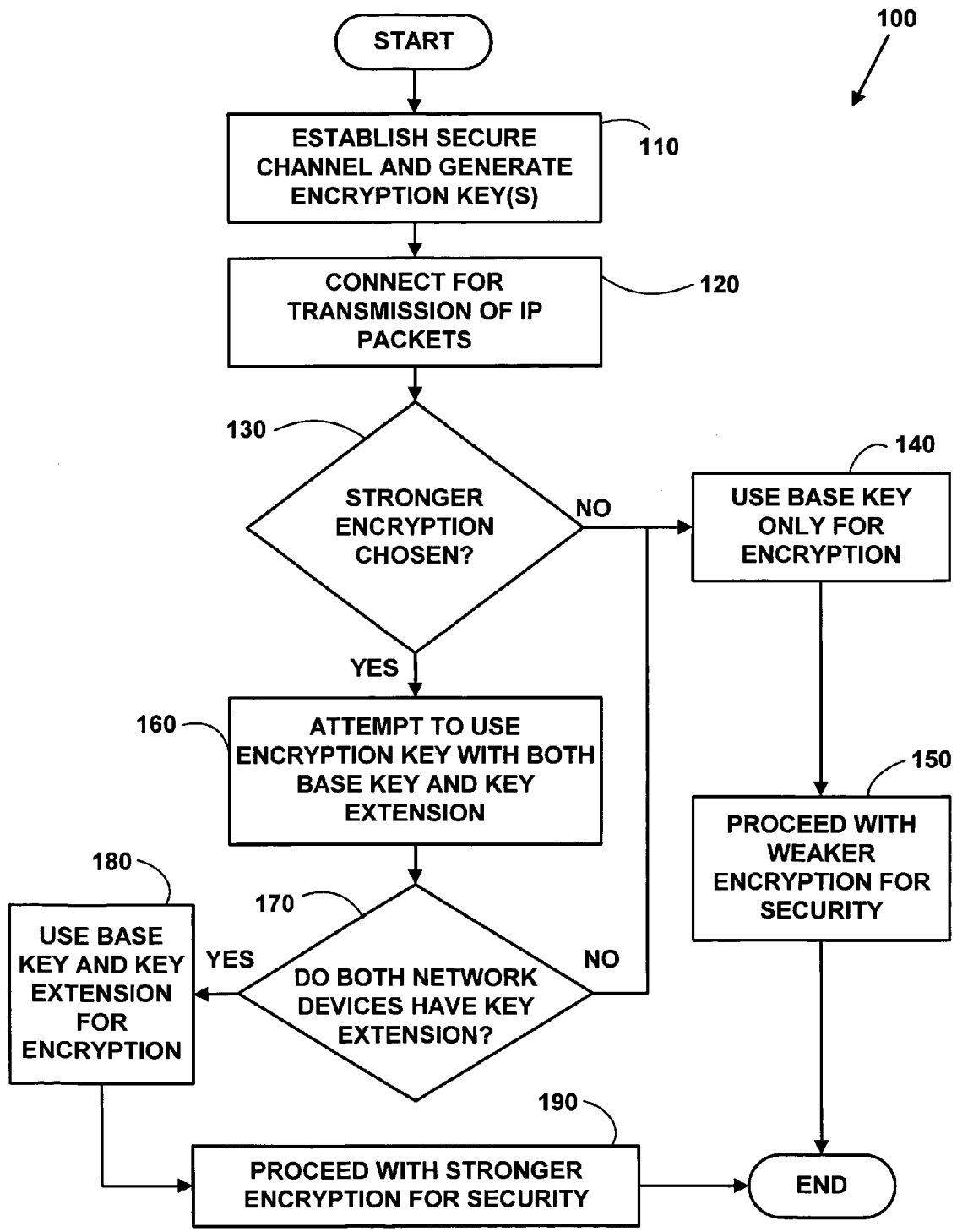
FIG. 5 is a flow diagram illustrating a preferred method for network security of the present invention.

A preferred method 100 for network security of the present invention will now be described with particular reference to FIGS. 1 and 5. As shown in FIG. 5, the method 100 of the present invention begins with Step 110. In Step 110, a secure IPSEC channel is established between the network devices 12, 14, 16 desiring to connect, and each of the network devices 12, 14, 16 generates its respective encryption keys 20, 22, 24. More specifically, the first network device 12 generates the first and second encryption keys 20, 22, the second network device 14 generates the first and third encryption keys 20, 24, and the third network device 16 generates the second and third encryption keys 22, 24.

The next step in the method 100 of the present invention is Step 120. In Step 120, each of the network devices connects for transmission of IP packets to any of the other network devices. It should be understood, however, that the connection between the first and third network devices 12, 16 is essentially the same (i.e., just different keys) as the connection between the first and second network devices 12, 14. Thus, to avoid unnecessary repetition and redundancy, only connections between the first and second network devices 12, 14 and the second and third network devices 14, 16 will be discussed herein.

The method 100 proceeds with Step 130, in which a determination is made as to whether the encryption used for transmitting IP packets should be a stronger encryption based on encryption keys with lengths greater than 56 bits, or a weaker encryption based on encryption keys with lengths no greater than 56 bits. If a determination is made that stronger encryption is not chosen, then the method 100 opts to use weaker encryption based on encryption base keys with lengths no greater than 56 bits in Step 140. For instance, if the first and second devices 12, 14 chose not to use stronger encryption to communicate with each other, then IP packets sent between the two network devices would be encrypted (and decrypted) using the first base key 20a (or the first encryption key 20 without the first key extension 20b). Alternatively, if the second and third network devices 14, 16 chose not to use stronger encryption to communicate with each other, then IP packets sent between the two network devices would be encrypted (and decrypted) using the third base key 24a (which is the same as the third encryption key 24). As shown in FIG. 5, after Step 140, the method 100 proceeds with using weaker encryption for the secure communication between connecting network devices in Step 150, and the method 100 is completed upon termination of the secure channel.

In contrast, if a determination is made that stronger encryption is chosen, then the method 100 attempts to use stronger encryption based on encryption keys with lengths greater than 56 bits in Step 160. For instance, if the first and second devices 12, 14 chose to use stronger encryption to communicate with each other, then an attempt would be made by the two network devices to encrypt their IP packets using the first encryption key 20 (which is comprised of the first base key 20a and the first key extension 20b). Alternatively, if the second and third network devices 14, 16 chose to use stronger encryption to communicate with each other, then an attempt would be made by the two network devices to encrypt their IP packets using the third encryption key 24. Since the third encryption key 24 preferably does not comprise a key extension and has a length of no greater than 56 bits, however, the second and third networks devices 14, 16 would also attempt to use their respective first and second key extensions 20b, 22b together with the third encryption key 24 to implement stronger encryption.

Method 100 next continues with Step 170, wherein a determination is made as to whether both of the network devices attempting to connect with stronger encryption have the same key extensions, and are thereby authorized to perform stronger encryption. If the network devices do not have the same key extensions, then stronger encryption cannot be used by the network devices, and instead weaker encryption must be implemented for security. For example, since the second and third network devices 14, 16 do not have the same key extensions (i.e., one has the first key extension 20b, the other has the second key extension 22b), only the third encryption key 24 can be used for encryption (and decryption), and stronger encryption with keys greater than 56 bits cannot be used by the second and third network devices 14, 16. In this case, the method 100 would continue with Step 140, as shown in FIG. 5.

On the other hand, if the network devices do have the same key extensions, then stronger encryption is permissible and can be used by the authorized network devices for security in Step 180. For instance, since the first and second network devices 12, 14 do have the same key extension (i.e., they both have the first key extension 20b), the first encryption key 20, which is comprised of both the first base key 20a and the first key extension 20b, can be used for stronger encryption (and decryption) with keys greater than 56 bits by the first and second network devices 12, 14. In this case, the method 100 proceeds with using stronger encryption for the secure communication between the authorized network devices (i.e., the first and second network devices 12, 14) in Step 190, and the method 100 is completed upon termination of the secure channel.

Figure 6:
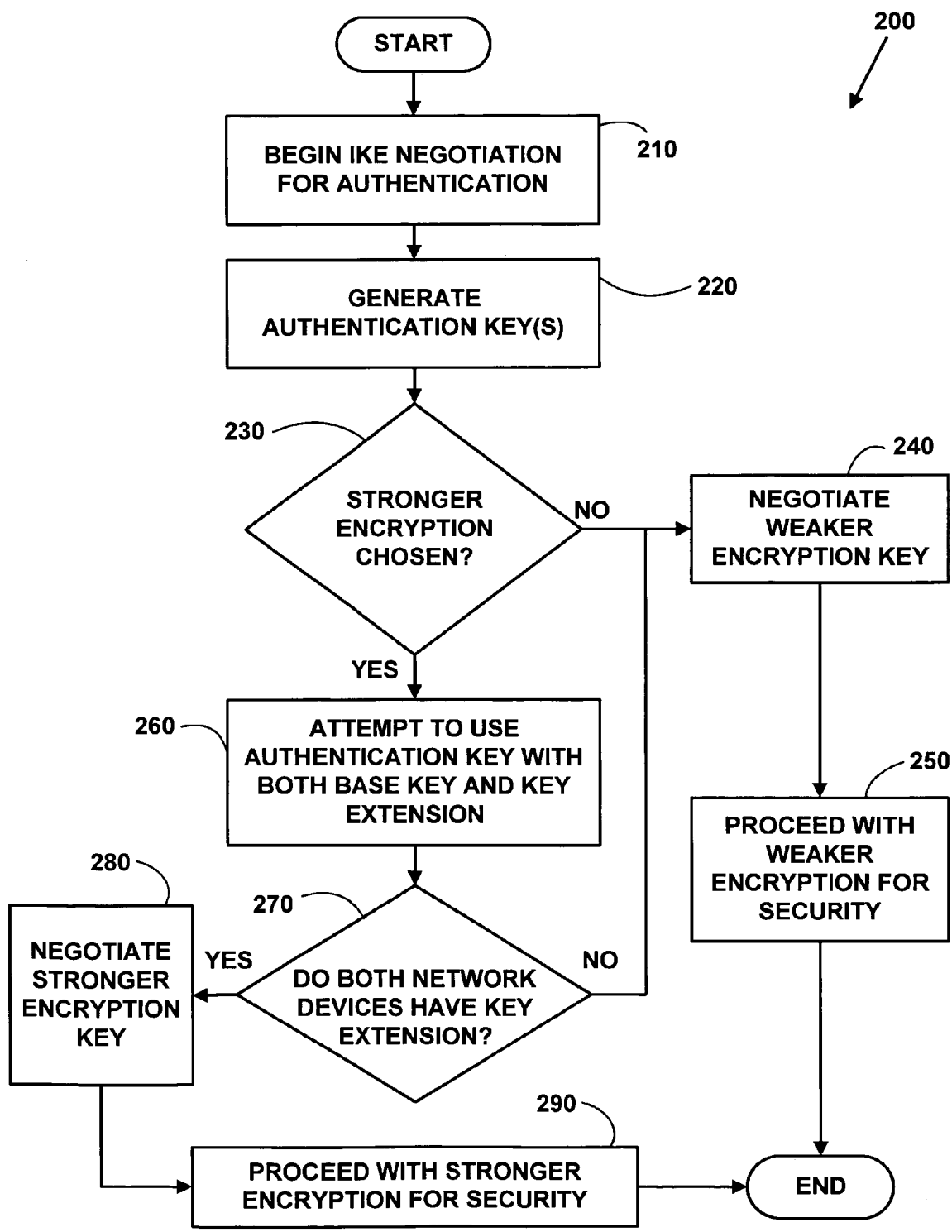
FIG. 6 is a flow diagram illustrating an exemplary method for network security of the present invention with authentication.

An exemplary method 200 for network security of the present invention using an authentication process, such as IKE negotiation, will now be described with particular reference to FIGS. 1 and 6. The method 200 is a result of modifying the method 100 to take into account authentication via the first, second, and third authentication keys 21, 23, 25. As shown in FIG. 6, the method 200 of the present invention begins with Step 210. In Step 210, IKE negotiation (or some other form of authentication) is started for authentication purposes between the network devices 12, 14, 16 desiring to connect.

The next step in the method 200 of the present invention is Step 220. In Step 220, each of the network devices 12, 14, 16 generates its respective authentication keys 21, 23, 25. More specifically, the first network device 12 generates the first and second authentication keys 21, 23, the second network device 14 generates the first and third authentication keys 21, 25, and the third network device 16 generates the second and third authentication keys 23, 25. As with the method 100, it should be understood that the authentication process and negotiation between the first and third network devices 12, 16 is essentially the same (i.e., just different keys) as the connection between the first and second network devices 12, 14. Thus, to avoid unnecessary repetition and redundancy, only the authentication processes and negotiations between the first and second network devices 12, 14 and the second and third network devices 14, 16 will be discussed herein.

The method 200 proceeds with Step 230, in which a determination is made as to whether the encryption used for transmitting IP packets should be a stronger encryption based on encryption keys with lengths greater than the threshold number of bits, t (e.g., 64 bits), or a weaker encryption based on encryption keys with lengths no greater than the threshold number of bits, t (e.g., 64 bits). If a determination is made that stronger encryption is not chosen, then the method 200 opts to negotiate weaker encryption keys with lengths no greater than the threshold number of bits, t (e.g., 64 bits) in Step 240. For instance, if the first and second devices 12, 14 chose not to use stronger encryption to communicate with each other, then the two network devices would negotiate a weaker modified first base key 20a' (which is the same as the first modified encryption key 20') with a length no greater than the threshold number of bits, t (e.g., 64 bits) for encrypting (and decrypting) IP packets sent between the two network devices. Such negotiation would involve the first base key 21a of the first authentication key 21, but not necessarily the first key extension 21b of the first authentication key 21.

Alternatively, if the second and third network devices 14, 16 chose not to use stronger encryption to communicate with each other, then the two network devices would negotiate a weaker modified third base key 24a+ (which is the same as the third modified encryption key 24') with a length no greater than the threshold number of bits, t (e.g., 64 bits) for encrypting (and decrypting) IP packets sent between the two network devices. Such negotiation would involve the third base key 25a of the third authentication key 25. As shown in FIG. 6, after Step 240, the method 200 proceeds with using weaker encryption for the secure communication between connecting network devices in Step 250, and the method 200 is completed upon termination of the secure channel.

In contrast, if a determination is made that stronger encryption is chosen, then the method 200 attempts to negotiate stronger encryption keys with lengths greater than the threshold number of bits, t (e.g., 64 bits) in Step 260. For instance, if the first and second devices 12, 14 chose to use stronger encryption to communicate with each other, then an attempt would be made by the two network devices to negotiate a stronger modified first base key 20a' (which is the same as the first modified encryption key 20') with a length greater than the threshold number of bits, t (e.g., 64 bits) for encrypting (and decrypting) IP packets sent between the two network devices. Such negotiation would involve both the first base key 21a and the first key extension 21b of the first authentication key 21, as a stronger modified first base key 20a' (i.e., the first modified encryption key 20') cannot be negotiated without the presence of the first key extension 21b in the first authentication key 21.

Alternatively, if the second and third network devices 14, 16 chose to use stronger encryption to communicate with each other, then an attempt would be made by the two network devices to negotiate a stronger modified third base key 24a' (which is the same as the third modified encryption key 24') with a length greater than the threshold number of bits, t (e.g., 64 bits) for encrypting (and decrypting) IP packets sent between the two network devices. Such negotiation would involve the third base key 25a of the third authentication key 25. Since the third authentication key 25 preferably does not comprise a key extension, however, the second and third networks devices 14, 16 may attempt to use the first and second key extensions 21b, 23b of their respective first and second authentication keys 21, 23, together with the third authentication key 25, to negotiate a stronger modified third base key 24a'.

Method 200 next continues with Step 270, wherein a determination is made as to whether both of the network devices attempting to negotiate a stronger encryption key have the same key extensions within their authentication keys, and are thereby authorized to use stronger encryption keys. If the network devices do not have the same key extensions (or do not even have key extensions) within their authentication keys, then stronger encryption keys cannot be negotiated for or used by the network devices, and instead weaker encryption keys must be negotiated and implemented for security. For example, since the second and third network devices 14, 16 do not have the same key extensions within their authentication keys (i.e., one has the first key extension 21b of the first authentication key 21, the other has the second key extension 23b of the second authentication key 23), the two network devices cannot negotiate for or use stronger encryption keys with lengths greater than the threshold number of bits, t (e.g., 64 bits). As a result, only weaker encryption keys with no greater than the threshold number of bits, t 56 bits can be negotiated for and used by the second and third network devices 14, 16. In this case, the method 200 would continue with Step 240, as shown in FIG. 6.

On the other hand, if the network devices do have the same key extensions within their authentication keys, then stronger encryption is permissible and can be negotiated for and used by the authorized network devices for security in Step 280. For instance, since the first and second network devices 12, 14 do have the same key extensions within their authentication keys (i.e., they both have the first key extension 21b of the first authentication key 21), the two network devices can negotiate for and use stronger encryption keys with lengths greater than the threshold number of bits, t (e.g., 64 bits). In this case, the method 200 proceeds with using stronger encryption for the secure communication between the authorized network devices (i.e., the first and second network devices 12, 14) in Step 290, and the method 200 is completed upon termination of the secure channel.

The present invention may be applied with particular advantage to network devices that are being exported from the U.S. and/or imported into foreign countries that limit the encryption strength that a network device can implement. It should also be readily apparent from the foregoing description and accompanying drawings that the network security system and method of the present invention are improvements over the prior art. Specifically, the network security system and method of the present invention enable network devices to be automatically configured for stronger or weaker encryption through the presence or absence of key extensions. In contrast to the prior art, by simply requiring the presence of a key extension for stronger encryption, the present invention can automatically control which network device can implement and/or negotiate stronger encryption keys, and which network devices must be limited to weaker encryption keys, without resorting to complex and costly customization of individual network devices.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein. Similarly, modifications and variations may also be readily implemented into the present invention without departing from the spirit of the invention. For example, the steps of the flow diagrams may be taken in sequences other than those described, and more or fewer elements may be used in the block diagrams. In addition, it should be understood, however, that the base keys used for encryption may have any suitable length greater than or less than 64 bits (or 40 bits) for the threshold between stronger and weaker encryption, depending on network and user preferences, as well as government regulations. The 64 bit threshold for stronger encryption is preferred for the present invention merely because of current U.S. government regulations regarding exports. Alternatively, a 40 bit threshold for stronger encryption may be used for the present invention in light of foreign government regulations regarding imports. Furthermore, while various elements of the preferred embodiments have been described as being implemented in software, for other embodiments, hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. Accordingly, the claims should not be read as limited to the described order or elements unless stated to that effect. Therefore, all embodiments that come within the scope and spirit of the following claims and equivalents thereto are claimed as the invention.

We claim:

1. A system for network security comprising:
    a first network device having a first encryption key, the first encryption key including a first base key and a key extension in addition to the first base key, the key extension being based on a hash function of an internal key and a network device identifier;
    a second network device having the first encryption key and a second encryption key, the second encryption key including a second base key, wherein the second network device is capable of communicating with the first network device using security determined by the first encryption key; and
    a third network device having the second encryption key, wherein the third network device is capable of communicating with the second network device using security determined by the second encryption key;
    wherein the first encryption key is used to encrypt and decrypt communications between the first and second network devices, and the second encryption key is used to encrypt and decrypt communications between the second and third network devices; and
    wherein the security determined by the first encryption key is stronger than the security determined by the second encryption key.

2. The system of claim 1 wherein the first encryption key has a bit length that is longer than a bit length of the second encryption key.

3. The system of claim 2 wherein the first encryption key has a length of greater than a threshold number of bits, and the second encryption key has a length of no greater than the threshold number of bits.

4. The system of claim 3 wherein the threshold is 64 bits.

5. The system of claim 1 wherein the first network device is located in a first jurisdiction, and the second network device is located in a second jurisdiction outside of the first jurisdiction.

6. The system of claim 1 wherein the first and second base keys are each based on at least a pro-shared key and a computed private key.

7. The system of claim 6 wherein the computed private key is a Diffie-Hellman key.

8. The system of claim 1 wherein the network device identifier is a software serial number.

9. A system for network security comprising:
    a first network device having a first encryption key, the first encryption key including a first base key and a first key extension in addition to the first base key, and a second encryption key, the second encryption key including a second base key and a second key extension in addition to the second base key, each of the first and second key extensions being based on a hash function of an internal key and a network device identifier;
    a second network device having the first encryption key and a third encryption key, the third encryption key including a third base key, wherein the second network device is capable of communicating with the first network device using security determined by the first encryption key; and
    a third network device having the second encryption key and the third encryption key, the third network device being capable of communicating with the first network device using security determined by the second encryption key, and the third network device also being capable of communicating with the second network device using security determined by the third encryption key;
    wherein the first encryption key is used to encrypt and decrypt communications between the first and second network devices, the second encryption key is used to encrypt and decrypt communications between the first and third network devices, and the third encryption key is used to encrypt and decrypt communications between the second and third network devices;
    wherein the security determined by the first encryption key is stronger than the security determined by the third encryption key; and
    wherein the security determined by the second encryption key is stronger than the security determined by the third encryption key.

10. The system of claim 9 wherein the first and second encryption keys each have a bit length that is longer than a bit length of the third encryption key.

11. The system of claim 10 wherein the first and second encryption keys each have a length of greater than a threshold number of bits, and the third encryption key has a length of no greater than the threshold number of bits.

12. The system of claim 11 wherein the threshold is 64 bits.

13. The system of claim 9 wherein the first network device is located in a first jurisdiction, and the second network device is located in a second jurisdiction outside of the first jurisdiction.

14. The system of claim 9 wherein the first, second, and third base keys are each based on at least a pre-shared key and a computed private key.

15. The system of claim 14 wherein the computed private key is a Diffie-Hellman key.

16. The system of claim 9 wherein the network device identifier is a software serial number.

17. A method for network security comprising the steps of:
providing a first network device, a second network device, and a third network device;
establishing a first secure communication between the first and second network devices based on a first encryption key, the first encryption key having a base key and a key extension in addition to the base key;
establishing a second secure communication between the second and third network devices based on a second encryption key;
basing each of the base key and the second encryption key on at least a pre-shared key and a computed private key;
basing the key extension on a hash function of an internal key and a network device identifier; and
using a stronger security for the first secure communication than the second secure communication;
wherein using the stronger security for the first secure communication than the second secure communication comprises using security determined by the first encryption key for the first secure communication, the first encryption key being used to encrypt and decrypt communications between the first and second network devices, and using security determined by the second encryption key for the second secure communication, the second key being used to encrypt and decrypt communications between the second and third network devices; and
wherein the security determined by the first encryption key is stronger than the security determined by the second encryption key.

18. The method of claim 17 wherein the second encryption key is identical to the base key.

19. The method of claim 17 further comprising the steps of using a length of greater than a threshold number of bits for the first encryption key, and using a length of no greater than the threshold number of bits for the second encryption key.

20. The method of claim 19 wherein the threshold is 64 bits.

21. A computer readable medium having stored therein instructions for causing at least one central processing unit to execute the method of claim 17.

22. A method for network security comprising the steps of:
providing a first network device, a second network device, and a third network device;
negotiating a first secure communication between the first and second network devices based on a first authentication key, the first authentication key having a base key and a key extension in addition to the base key;
deriving a first encryption key from the negotiation of the first secure communication;
negotiating a second secure communication between the second and third network devices based on a second authentication key;
deriving a second encryption key from the negotiation of the second secure communication;
basing each of the base key and the second authentication key on at least a pre-shared key and a computed private key;
basing the key extension on a hash function of an internal key and a network device identifier; and
using a stronger security for the first secure communication than the second secure communication;
wherein using the stronger security for the first secure communication than the second secure communication comprises using security determined by the first encryption key for the first secure communication, the first encryption key being used to encrypt and decrypt communications between the first and second network devices, and using security determined by the second encryption key for the second secure communication, the second encryption key being used to encrypt and decrypt communications between the second and third network devices; and
wherein the security determined by the first encryption key is stronger than the security determined by the second encryption key.

23. The method of claim 22 wherein the second authentication key is identical to the base key.

24. The method of claim 22 further comprising the steps of using a length of greater than a threshold number of bits for the first encryption key and using a length of no greater than the threshold number of bits for the second encryption key.

25. The method of claim 24 wherein the threshold is 64 bits.

26. A computer readable medium having stored therein instructions for causing at least one central processing unit to execute the method of claim 22.

27. A system for network security comprising:
a first network device having a first authentication key, the first authentication key including a first base key and a key extension in addition to the first base key, the key extension being based on a hash function of an internal key and a network device identifier;
a second network device having the first authentication key and a second authentication key, the second authentication key including a second base key, wherein the first and second devices are capable of using the first authentication key to negotiate a first encryption key so as to communicate using security determined by the first encryption key; and
a third network device having the second authentication key, wherein the second and third network devices are capable of using the second authentication key to negotiate a second encryption key so as to communicate using security determined by the second encryption key;
wherein the first encryption key is used to encrypt and decrypt communications between the first and second network devices, and the second encryption key is used to encrypt and decrypt communications between the second and third network devices; and
wherein the security determined by the first encryption key is stronger than the security determined by the second encryption key.

28. The system of claim 27 wherein the first encryption key has a length of greater than a threshold number of bits, and the second encryption key has a length of no greater than a threshold number of bits.

29. The system of claim 28 wherein the threshold is 64 bits.

30. A system for network security comprising:
a first network device having a first authentication key, the first authentication key including a first base key and a first key extension in addition to the first base key, and a second authentication key, the second authentication key including a second base key and a second key extension in addition to the second base key, each of the first and second key extensions being based on a hash function of an internal key and a network device identifier;
a second network device having the first authentication key and a third authentication key, the third authentication key including a third base key, wherein the first and second network devices are capable of using the first authentication key to negotiate a first encryption key so as to communicate using security determined by the first encryption key; and
a third network device having the second authentication key and the third authentication key, the first and third network devices being capable of using the second authentication key to negotiate a second encryption key so as to communicate using security determined by the second encryption key, and the second and third network devices being capable of using the third authentication key to negotiate a third encryption key so as to communicate using security determined by the third encryption key;
wherein the first encryption key is used to encrypt and decrypt communications between the first and second network devices, the second encryption key is used to encrypt and decrypt communications between the first and third network devices, and the third encryption key is used to encrypt and decrypt communication between the second and third network devices, and
wherein the security determined by the first encryption key is stronger than the security determined by the third encryption key; and
wherein the security determined by the second encryption key is stronger than security determined by the third encryption key.

31. The system of claim 30 wherein the first and second encryption keys each have a length of greater than a threshold number of bits, and the third encryption key has a length of no greater than a threshold number of bits.

32. The system of claim 31 wherein the threshold is 64 bits.

* * * * *